United States Patent [19]

Ohmura et al.

[11] Patent Number: 5,191,030

[45] Date of Patent: Mar. 2, 1993

[54] PROCESS FOR PRODUCING AMINO GROUP TERMINATED POLYPHENYLENE ETHER

[75] Inventors: Haruo Ohmura; Mitsutoshi Aritomi; Michiharu Kihira; Hiroshi Nakano, all of Mie, Japan

[73] Assignee: Mitsubishi Petrochemical Co., Ltd., Tokyo, Japan

[21] Appl. No.: 762,112

[22] Filed: Sep. 19, 1991

[30] Foreign Application Priority Data

Sep. 19, 1990 [JP] Japan .................................. 2-247378
Apr. 10, 1991 [JP] Japan .................................. 3-103518
Apr. 10, 1991 [JP] Japan .................................. 3-103533

[51] Int. Cl.$^5$ .............................................. C08L 71/12
[52] U.S. Cl. ..................................... 525/390; 525/905
[58] Field of Search ................................ 525/390, 905

[56] References Cited

U.S. PATENT DOCUMENTS 4,746,708  5/1988  Sybert .................................. 525/390

Primary Examiner—James J. Seidleck
Assistant Examiner—Thomas Hamilton, III
Attorney, Agent, or Firm—Sughrue, Mion, Zinn, Macpeak & Seas

[57] ABSTRACT

A process for producing an amino group terminated polyphenylene ether represented by the following general formula (I)

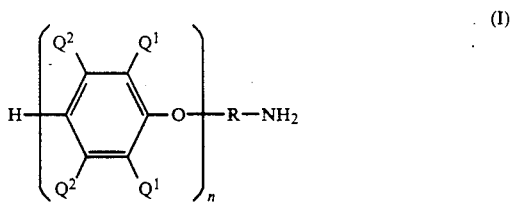

(I)

wherein $Q^1$s each represents a halogen atom, a primary or secondary alkyl group, a phenyl group, an aminoalkyl group, a hydrocarbon oxy group or a halohydrocarbon oxy group; $Q^2$s each represents a hydrogen atom, a halogen atom, a primary or secondary alkyl group, a phenyl group, a haloalkyl group, a hydrocarbon oxy group or halohydrocarbon oxy group; R represents an aliphatic hydrocarbon group having 1 to 32 carbon atoms, an aromatic hydrocarbon group or an araliphatic hydrocarbon group; and n is a number of 10 to 500, which process comprises reacting a polyphenylene ether represented by the following general formula (II)

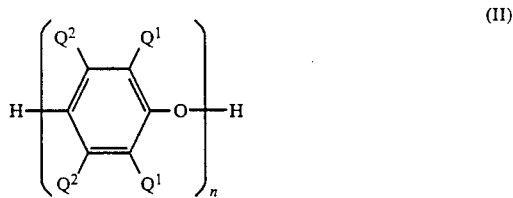

(II)

wherein $Q_1$, $Q_2$ and n are as define above, with a primary amine halide represented by the following general formula (III)

$$X-R-NH_2 \quad\quad (III)$$

wherein R is as defined above, and X represents a halogen atom.

2 Claims, 1 Drawing Sheet

PROCESS FOR PRODUCING AMINO GROUP TERMINATED POLYPHENYLENE ETHER

FIELD OF THE INVENTION

This invention relates to a process for producing an amino group-terminated polyphenylene ether comprising functionalizing the terminal phenolic hydroxyl group of a polyphenylene ether.

The amino group-terminated polyphenylene ether obtained by the process of the present invention has the advantages that when the ether is blended with a resin having a functional group, the amino group reacts with the functional group of the resin blended therewith to thereby enhance the compatibility between the resins, whereby the impact strength of the resin composition can be increased in comparison with that of an unfunctionalized polyphenylene ether. Further, since the amino group-terminated polyphenylene ether has an amino group, it can be used as a precursor for use in producing graft copolymers or block copolymers by reacting the amino group with organic acids, epoxy compounds or organic halides.

BACKGROUND OF THE INVENTION

Polyphenylene ether resins are very useful thermoplastic resins because of their excellent heat resistance, mechanical characteristics, electrical characteristics, water resistance, acid resistance, alkali resistance and self-extinguishing properties.

It is expected that these resins will be used as engineering plastic materials in the fields of, for example, sealing materials for automobile ignition coils, cranks, gears and connectors for electrical components. However, these resins have a high glass transition temperature, and hence they have a high melt viscosity and poor moldability. Further, these resins have the disadvantage in that their impact resistance is poor in comparison with polyamides and polycarbonates.

To solve these problems, these resins have been blended with polyolefins or other engineering plastics such as polyamides, polycarbonates or polybutylene terephthalate. These two types of polymers have essentially poor compatibility, and molded articles prepared from these resins compositions are brittle and have low mechanical strength and low impact strength. Hence, the molded articles cannot be put to practical use. To solve these problems, compatibilizing agents have been used. See, in this regard, JP-B-1-17504 and JP-B-3-6185 (The term "JP-B" as used herein means an "examined Japanese patent publication"). Most of these compatibilizing agents are graft or block copolymers of both polyphenylene ether and the polymer to be blended. In the preparation of these copolymers, it is considered that the terminal phenolic hydroxyl group of the polyphenylene ether reacts with a functional group of the other polymer.

However, the species of functional groups which are capable of reacting with the above terminal phenolic hydroxyl group are limited. Hence, the range of the use thereof is also limited to certain applications. Accordingly, there have been proposed many functionalized polyphenylene ethers to improve the reactivity thereof. Many of such proposals involve an acid anhydride being introduced into the polyphenylene ether (see, JP-W-62-500456 (the term "JP-W" as used herein means an "unexamined published international patent application"), JP-A-63-10656 (the term "JP-A" as used herein means an "unexamined published Japanese patent application") and WO87/540) or an hydroxyl group being introduced into the polyphenylene ether (see, JP-A-63-128021 and JP-A-63-130660). The introduction of an amino group into the polyphenylene ether leads to problems because the amino group itself has high reactivity.

The following disclosure reflects a preparative example of an aminated polyphenylene ether as is given in Example 13 of JP-W-63-503391 (corresponding to WO87/7280 and U.S. Pat. No. 4,746,708).

A blend consisting of 100 parts (by weight) of polyphenylene ether and 0.5 parts of maleic anhydride was prepared in a Henschel mixer, and extruded through a twin-screw extruder at 330° C. (extruder temperature). The resulting extrudate composed of an anhydride functionalized polyphenylene ether was quenched in a water bath and pelletized. There was thus obtained the final acid anhydride-functionalized polyphenylene ether.

To a solution of 10 g of the anhydride-functionalized polyphenylene ether in 100 ml of toluene there was added 3 ml of ethylenediamine while stirring in a nitrogen atmosphere. After stirring was continued for 6 hours, methanol was added thereto to precipitate an N-aminoalkylimide-functionalied polyphenylene ether. The product was re-precipitated from chloroform by using methanol and dried at 60° C. under vacuum.

The above-described process required a multi-stage reaction comprising first preparing an unsaturated carboxylic acid-modified polyphenylene ether and then reacting it with ethylenediamine. In addition, the process has problems in that polyphenylene ether gels during the course of the reaction in the latter stage thereof or a high temperature melt reaction is necessary. No disclosure occurs concerning the yield of the aminated polyphenylene ether and the physical properties thereof in Example 13 of the aforesaid patent publication. In addition, no evaluation of the blend of the aminated polyphenylene ether with another resin was made.

SUMMARY OF THE INVENTION

Accordingly, it is an object of the present invention to provide a process for easily producing an amino group terminated polyphenylene ether which has remarkably improved compatibility with other resins such as polyolefins, polyesters or polyamides.

The present inventors found that an amino group-terminated polyphenylene ether can be easily obtained in comparison with the prior art by functionalizing the terminal phenolic hydroxyl group of a polyphenylene ether with a primary amine halide. The present invention was reached on the basis of this finding.

The present invention provides a process for producing an amino group-terminated polyphenylene ether represented by the following general formula (I)

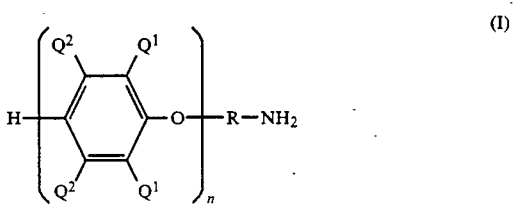

wherein $Q^1$s each represents a halogen atom, a primary or secondary alkyl group having 1 to 12 carbon atoms, an aryl group having 6 to 12 carbon atoms, an aminoalkyl group having 1 to 12 carbon atoms, a hydrocarbon oxy group having 1 to 12 carbon atoms or a halohydrocarbon oxy group having 1 to 12 carbon atoms; $Q^2$s each represents a hydrogen atom, a halogen atom, a primary or secondary alkyl group having 1 to 12 carbon atoms, an aryl group having 6 to 12 carbon atoms, a haloalkyl group having 1 to 12 carbon atoms, a hydrocarbon oxy group having 1 to 12 carbon atoms, or a halohydrocarbon oxy group having 1 to 12 carbon atoms; R represents an aliphatic hydrocarbon group having 1 to 32 carbon atoms, an aromatic hydrocarbon group having 6 to 32 carbon atoms or an araliphatic hydrocarbon group having 7 to 12 carbon atoms; and n is a number of 10 to 500, which process comprises reacting a polyphenylene ether represented by the following general formula (II)

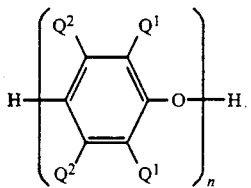
(II)

wherein $Q_1$, $Q_2$ and n are as define above, with a primary amine halide represented by the following general formula (III)

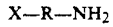
X—R—NH$_2$  (III)

wherein R is as defined above, and X represents a halogen atom.

DETAILED DESCRIPTION OF THE INVENTION

Figure 1:
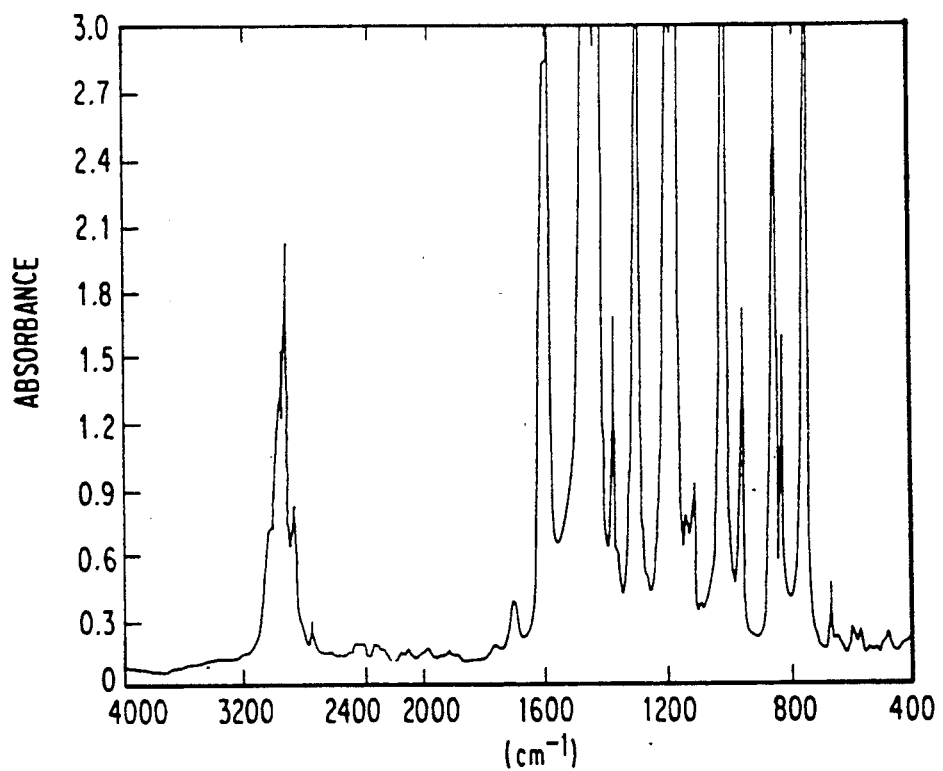
FIG. 1 shows the infrared absorption spectrum of the amino group-terminated polyphenylene ether (a cast film prepared from a chloroform solution) obtained in Example 2.

The polyphenylne ether used in the present invention is a homopolymer or a copolymer having a structural unit represented by general formula (II)

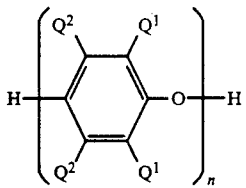
(II)

Preferred examples of the primary alkyl group represented by $Q^1$ and $Q^2$ include methyl, ethyl, n-propyl, n-butyl, n-amyl, isoamyl, 2-methylbutyl, n-hexyl, 2,3-dimethylbutyl, 2-, 3- or 4-methylpentyl and heptyl. Preferred examples of the secondary alkyl group include isopropyl, sec-butyl and 1-methylpentyl. In many cases, $Q^1$ is an alkyl group or a phenyl group, more preferably an alkyl group having 1 to 4 carbon atoms, and $Q^2$ is a hydrogen atom.

Preferred polyphenylene ether homopolymers include homopolymers comprising 2,6-dimethyl-1,4-phenylene ether or 2,6-diethyl-1,4-phenylene ether units. Preferred copolymers include random copolymers comprising a combination of one or both of the above-described units with 2,3,6 trimethyl-1,4-phenylene ether units. Many examples of homopolymer or random copolymers which can be preferably used herein are described in WO87/07279. Also suitable are polyphenylene ethers having a molecular segment for improving characteristics such as melt viscosity and/or impact strength. For example, polyphenylene ethers obtained by grafting a vinyl monomer such as acrylonitrile or an aromatic vinyl compound (e.g., styrene) or a polymer such as polystyrene or an elastomer thereof onto a polyphenylene ether (see JP-B-63-60059) can be preferably used.

Polyphenylene ethers useful herein generally have a molecular weight corresponding to an intrinsic viscosity of about 0.2 to 0.8 dl/g as measured in chloroform at 30° C. The polyphenylene ethers useful herein generally have a number average molecular weight of 3,000 to 40,000 as measured by gel permeation chromatography and a weight average molecular weight of 20,000 to 80,000.

The polyphenylene ethers are generally prepared by oxidative coupling of the above-mentioned vinyl monomer(s). A number of catalyst systems are known for use in the oxidative coupling polymerization of the above-mentioned monomer(s). Any conventional catalysts can be used without particular limitation. For example, combinations of at least one heavy metal compound of copper, manganese, cobalt, etc., with various other substances can be used.

The primary amine halide of general formula (III) which is used as a functionalizing agent for polyphenylene ether is a compound having both a halogen atom and an amino group on the hydrocarbon group of an aliphatic hydrocarbon group, an aromatic hydrocarbon group or an araliphatic group. Examples of X are fluorine, chlorine, bromine and iodine.

Preferred examples of the primary amine halide include halogenated aliphatic hydrocarbon primary amines having 2 to 5 carbon atoms such as 2-chloroethylamine, 2-bromoethylamine, 3-chloropropylamine, 3-bromopropylamine, 2-chlorobutylamine and 2-chloroamylamine, hydrochlorides thereof and hydrobromides thereof.

The amino group-terminated polyphenylene ethers of general formula (I) according to the present invention can be easily produced by reacting a polyphenylene ether of general formula (II) with a primary amine halide of general formula (III) in a mixed solvent consisting of an organic solvent capable of dissolving the polyphenylene ether and the primary amine halide and water containing a water-soluble inorganic basic catalyst dissolved therein in the presence of a phase transfer catalyst.

It is desirable that the organic solvent is a compound capable of dissolving the starting polyphenylene ether. Specific examples of the organic solvent include aromatic hydrocarbon solvents such as benzene, toluene and xylene; halogenated aromatic hydrocarbon solvents such as chlorobenzene and dichlorobenzene; and halogenated aliphatic hydrocarbon solvents such as chloroform, trichloroethylene and carbon tetrachloride. Examples of the water-soluble inorganic basic catalyst include alkali metal hydroxides such as sodium hydroxide and potassium hydroxide; and alkali metal carbonates such as sodium carbonate and potassium carbonate.

Examples of the phase transfer catalyst include quaternary ammonium salt compounds, quaternary phosphonium salt compounds and tertiary sulfonium salt compounds. Among them, quaternary ammonium salt compounds are preferred. Examples of the quaternary ammonium salt compounds include benzyltrimethylammonium chloride, benzyltriethylammonium chloride, benzyltributylammonium chloride, tetrabutylammonium bromide, tetrabutylammonium hydrogensulfate and trioctylmethylammonium chloride.

The reaction is carried out by using 1 to 30 mols, preferably 2 to 20 mols, of the functionalizing agent of general formula (III) per mol of the terminal phenolic hydroxyl group of the polyphenylene ether. The organic solvent is used in an amount of 300 to 1000 parts by weight based on 100 parts by weight of the polyphenylene ether. Water is used in an amount of 1 to 100 parts by weight based on 100 parts by weight of the solvent. The basic catalyst is used in an amount of 1 to 10 equivalents, preferably 1 to 5 equivalents per one equivalent of the functionalizing agent. The phase transfer catalyst is used in an amount of 1 to 20 parts by weight based on 100 parts by weight of the polyphenylene ether.

The procedure for producing of the amino group-terminated polyphenylene ether of general formula (I) according to the present invention is illustrated below.

The polyphenylene ether is dissolved in the organic solvent by heating. An aqueous solution of the basic catalyst and the phase transfer catalyst are added thereto. Subsequently, the functionalizing agent is added thereto at a temperature ranging from room temperature to a temperature below the boiling point of the organic solvent used to carry out the reaction. The mixture is heated with stirring for 1 to 6 hours until the reaction is completed, whereby the desired product is obtained.

Under the above reaction conditions, the amount of the primary amine halide to be added to the terminal of the polyphenylene ether is one molecule. However, there is the possibility that one further mol or more of the primary amine halide is reacted with the terminal amino group of the resulting functionalized polyphenylene ether. In this case, the terminal of the resulting polyphenylene ether is still an amino group. Accordingly, this case is also included with the scope of the present invention.

The amino group-terminated polyphenylene ethers of general formula (I) are excellent in compatibility with resins having a functional group such as carboxyl group (—COOH) or epoxy group.

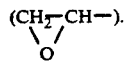

Hence, compositions with these resins are excellent in injection moldability and extrudability and give molded articles of excellent heat resistance, mechanical strength and dimensional accuracy. Examples of such resins having a functional group include polyamides such as nylon 6, nylon 6,6, nylon 6,10 and nylon 6,12; thermoplastic polyesters such as polyethylene terephthalate and polybutylene terephthalate; carboxyl group-containing olefin resins obtained by grafting an unsaturated carboxylic acid onto an olefin resin; and epoxy group-containing olefin resins obtained by grafting an epoxy compound onto an olefin resin. This class of functional group-containing resins is hereafter referred to as functional group-containing resins of component (B).

The olefin resins for use in obtaining the above-described carboxyl group-containing olefin resins and epoxy group-containing include homopolymers of α-olefins such as ethylene, propylene, butene and hexene, copolymers composed of two or more of these α-olefins and copolymers of these α-olefins with 0.05 to 50 mole % of other copolymerizable unsaturated monomer(s). Specific examples of these homopolymers and copolymers include (ultra)low-density polyethylene, medium-density polyethylene, high-density polyethylene, polypropylene, ethylene-propylene copolymers, ethylene-vinyl acetate copolymers, ethylene-(meth)acrylic acid copolymers and ionic crosslinked products thereof, ethylene-(meth)acrylic ester copolymers, mixtures of these polymers and graft copolymers obtained by grafting maleic anhydride, (meth)acrylic acid or a (meth)acrylic alkyl ester (alkyl group having 1 to 4 carbon atoms) onto these polymers. In addition, olefin resins obtained by using a polyunsaturated compound such as a dialkenylbenzene, methyloctadiene or methylhexadiene as a comonomer are also included (see JP-A-62-241907, JP-A-2-14561 and JP-B-64-9327).

Examples of unsaturated carboxylic acids for use in modifying the olefin resins include acrylic acid, methacrylic acid, maleic acid, itaconic acid, citraconic acid, fumaric acid, crotonic acid, mesaconic acid, sorbic acid and esters, acid anhydrides, metal salts, amides and imides thereof. Among these, acrylic acid, methacrylic acid and maleic anhydride are preferred. These compounds may be used either alone or in combination of two or more thereof.

The unsaturated carboxylic acid is used in an amount of 0.1 to 300 parts (by weight; the same applies hereafter), preferably 1 to 200 parts, based on 100 parts of the olefin resin. When the amount of the unsaturated carboxylic acid is less than 0.1 part, an improving effect is scarcely obtained by the present invention, while when the amount is more than 300 parts, the mechanical properties of the resin composition are deteriorated.

The carboxyl group-containing olefin resins (B) can be produced by radical graft polymerizing an unsaturated carboxylic acid onto an olefin resin in a conventional manner (see JP-A-57-98508, JP-A-1-31527, JP-A-61-266411 and JP-A-50-119888). Examples of processes for producing the carboxyl group-containing olefin resins (B) include a process where an olefin resin in the presence of the monomer is irradiated with radiation such as gamma rays or electron beams, a process where an olefin resin is irradiated with radiation and the monomer is then allowed to coexist in the polymerization mixture, and a process where an olefin resin and the monomer in a dissolved, molten or dispersed state are subjected to graft polymerization in the presence or absence of a radical polymerization catalyst. Any of these processes can be used in the present invention.

Examples of the radical polymerization catalyst include organic peroxides such as benzoyl peroxide, t-butyl peroxybenzoate, dicumyl peroxide, t-butyl hydroperoxide, t-butyl peroxy-acetate, diisopropyl peroxy dicarbonate, 2,2-bis(t-butyl peroxy)octane and methyl ethyl ketone peroxide; inorganic peroxides such as potassium persulfide; azo compounds such as α,α'-azobis-isobutyronitrile; and redox catalysts such as a catalyst comprising hydrogen peroxide and a ferrous salt. These radical polymerization catalysts are properly chosen according to the polymerization technique, and may be used either alone or as a combination of two or more of them.

The radical graft polymerization reaction is generally carried out at a temperature of 30° to 350° C., preferably 50° to 300° C. The polymerization time is from 30 seconds to 50 hours, preferably from one minute to 24 hours. The radical polymerization catalysts are used in an amount of 0 to 100 parts, preferably 0 to 30 parts, based on 100 parts of the unsaturated carboxylic acid.

Epoxy groups can be introduced into the olefin resins by any known methods without particular limitation (see JP-A-61-166311, JP-A-61-85405, JP-A-60-63243, JP-A-58-173135 and JP-A-59-62613). For example, there can be used a method (i) where an olefin resin is modified with a compound having an ethylenic double bond and an epoxy group such as glycidyl methacrylate or glycidyl maleate in the presence of a radical generating agent such as an organic peroxide. The amount of epoxy groups to be introduced by an appropriate method is preferably 0.01 to 30% by weight, more preferably 0.1 to 10% by weight, in terms of the content of such compound in the resulting modified olefin resin. When the amount is less than 0.1% by weight, an improving effect can be scarcely obtained by the present invention, while when the amount is more than 30% by weight, the mechanical properties of the composition are deteriorated.

When epoxy groups are introduced into the olefin resins obtained by using a polyunsaturated compound such as a dialkenylbenzene, methyloctadiene or methylhexadiene as a comonomer component, there can be used a method (ii) where ethylenic unsaturated bonds in the olefin resin are oxidized with (a) a peracid such as performic acid, peracetic acid or perbenzoic acid, (b) a hydroperoxide or hydrogen peroxide in the presence or absence of a catalyst such as a vanadium, tungsten or molybdenum compound or (c) an alkaline hydroperoxide (d) sodium hydrochlorite in the presence or absence of a metal porphyrin complex such as a manganese porphyrin complex, and a method (iii) wherein an addition reaction of a compound having at least one epoxy group per molecule (e.g., a thiol compound such as thioglycidol or glycidyl thioglycolate) to ethylenic unsaturated bonds in the olefin resin is carried out. The amount of epoxy groups to be introduced by methods (ii) and (iii) is preferably at least 1%, more preferably at least 5%, still more preferably at least 10%, based on the amount of the ethylenic unsaturated bond in the olefin resin. When the amount is less than 1%, an improving effect can be scarcely obtained by the present invention.

In methods (ii) and (iii), the olefin resins in a dissolved or molten state are often subjected to the reaction. However, the resins can also be wet with a solvent and the reaction carried out. Examples of the solvent which can be used include aliphatic hydrocarbons such as octane, decane and isooctane, alicyclic hydrocarbons such as decalin, aromatic hydrocarbons such as toluene, xylene, ethylbenzene, tetralin, halogenated aliphatic hydrocarbons such as carbon tetrachloride, halogenated alicyclic hydrocarbons, halogenated aromatic hydrocarbons such as chlorobenzene, dichlorobenzene and trichlorobenzene, esters having 6 or more carbon atoms, ethers having 6 or more carbon atoms, ketones having 6 or more carbon atoms such as methyl ethyl cellosolve, and carbon disulfide. A mixture of two or more of them can be used. The rate of reaction of the ethylenic unsaturated bonds may be not 100%, and products formed by a side reaction may be incorporated, so long as an epoxy group(s) is/are substantially introduced.

The blending ratio of the amino group-terminated polyphenylene ether of general formula (I) (component A) and the functionalized olefin resin (component B) in the resin composition is such that the amount of component A is 10 to 90% by weight, preferably 20 to 80% by weight, more preferably 20 to 50% by weight, and the amount of component B is 90 to 10% by weight, preferably 80 to 20% by weight, more preferably 80 to 50% by weight based on the total weight of components A and B.

If desired, a part of component A may be diluted with an unmodified polyphenylene ether, or the functionalized olefin resin of component B may be diluted with an unfunctionalized olefin resin (5 to 80% by weight in the composition).

The thermoplastic resin composition may contain conventional additives such as an antioxidant, weatherability improver, nucleating agent, flame retarder, slip agent, plasticizer, fluidity improver, parting agent, pigment and dispersant in addition to components A and B. These additives may be used in an amount of 0.1 to 10 parts by weight based on 100 parts by weight of the resin.

Further, a conventional organic or inorganic filler or a reinforcing agent such as glass fiber, mica, talc, wollastonite, potassium titanate, calcium carbonate or silica may be added to improve rigidity, heat resistance, dimensional accuracy and dimensional stability. The filler or reinforcing agent is used in an amount of 5 to 60 parts by weight based on 100 parts by weight of the resin.

Furthermore, the addition of a rubber component, particularly a styrene-butadiene copolymer rubber or a hydrogenated product thereof, an ethylene-propylene copolymer rubber or an ethylene-propylene-diene copolymer rubber is effective as an impact modifier to improve the impact strength of the resin composition. The amount of the rubber blended varies depending on the physical values to be obtained, but is 5 to 30 parts by weight per 100 parts by weight of the resin when improvement is to be directed to obtaining well-balanced properties between the rigidity of the composition and the impact strength thereof.

The thermoplastic resin compositions of the present invention can be obtained by kneading the above-described components in a kneader such as a single screw extruder, a twin-screw extruder or a Banbury mixer. The components may be mixed in any order. However, when mixing is carried out by melt-kneading, it is preferred that mixing is made in such a manner that a higher viscosity material is first added.

The present invention is now illustrated in greater detail with reference to Examples, but it should be understood that the present invention is not deemed to be limited thereto.

The rate of reaction of the terminal phenolic hydroxyl group of the polyphenylene ether and the formation of amino group were determined by measuring the IR absorption spectrum of a 1.5 wt. % carbon tetrachloride solution of the aminated polyphenylene ether by using a quartz cell having a light pass length of 10 mm.

The reaction rate was calculated from the absorbance (3622 cm$^{-1}$) of the terminal phenolic hydroxyl group of the polyphenylene ether before and after the reaction.

EXAMPLES 1 to 3

Into a reactor were charged 20.0 parts by weight of poly (2,6-dimethyl-1,4-phenylene ether (hereinafter abbreviated as PPE) having an intrinsic viscosity of 0.30 dl/g as measured in chloroform at 30° C. and 180 parts by weight of toluene. The mixture was heated at 80° C. with stirring to dissolve the polyphenylene ether. Subsequently, 7.0 parts by weight of a 50% aqueous solution of sodium hydroxide (based on solution weight) as the basic catalyst and 2.0 parts by weight of trioctylmethylammonium chloride as the phase transfer catalyst were added thereto. The temperature of the reaction mixture was then elevated to 90° C. Subsequently, each of the functionalizing agents (2-chloroethylamine, 3-chloropropylamine, 2-bromoethylamine) in an amount as given in Table 1 in the form of an aqueous solution was added thereto over a period of 15 minutes. After the mixture was stirred with heating for 7 hours, the reaction mixture was poured into 1200 parts by weight of methanol to precipitate the resulting modified resin. The precipitate was collected by filtration, washed with 1000 parts by weight of water and then 800 parts by weight of methanol, and dried at 80° C. under reduced pressure to obtain the desired amino group-terminated polyphenylene ether. The yield and the rate of the reaction of the terminals of the polyphenylene ether are shown in Table 1. It was found from the proton nuclear magnetic resonance absorption spectrum of the product that the number of the primary amine halide added was one molecule.

Figure 2:
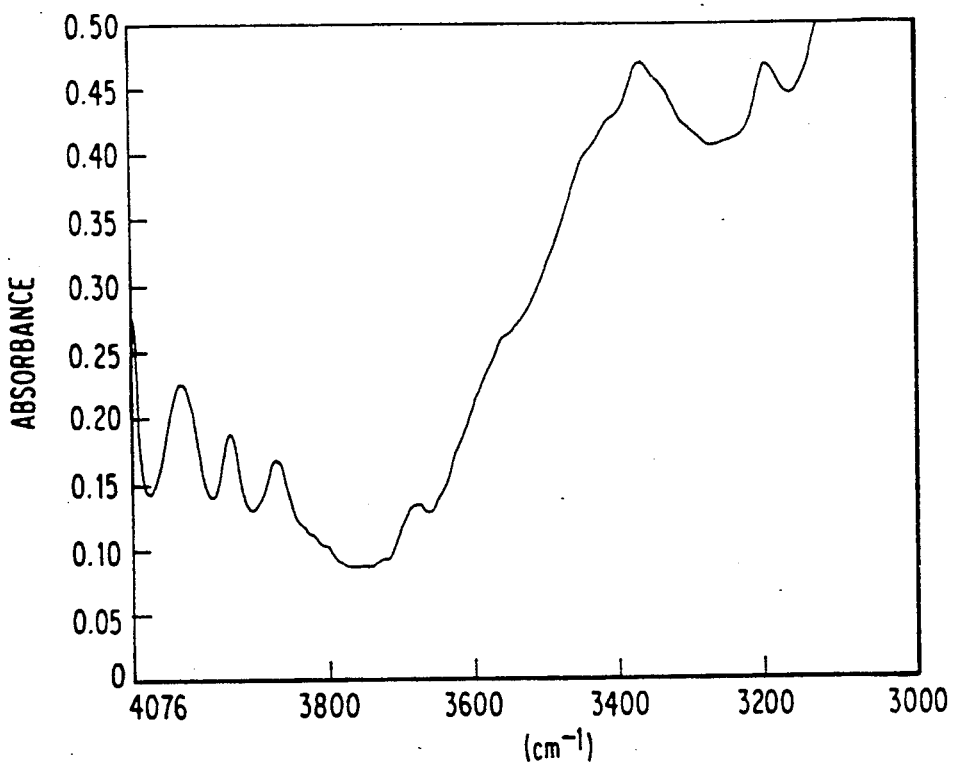
FIG. 2 shows the infrared absorption spectrum of a carbon tetrachloride solution of the functionalized polyphenylene ether obtained in Example 2.

FIG. 1 is an infrared absorption spectrum of a cast film prepared from a chloroform solution of the amino group-terminated polyphenylene ether obtained in Example 2. FIG. 2 is an infrared absorption spectrum of a carbon tetrachloride solution of the amino group-terminated polyphenylene ether obtained in Example 2. In the latter case, an absorption at nearly 3380 cm$^{-1}$ due to the primary amine is seen.

was continued at 110° C. for 3 hours. The reaction mixture was poured into 15 l of acetone to precipitate the product which was then collected by filtration and washed. This operation was repeated three times. The product was dried under reduced pressure to obtain a graft-modified propylene resin. The graft-modified propylene resin was found to have a glycidyl methacrylate content of 0.75% by weight from infrared spectroanalysis and an MFR of 14 g/10 min. The thus-obtained resin is hereafter referred to as epoxy-modified olefin resin (1).

PREPARATION EXAMPLE 2

Preparation of Modified Olefin Resin

Into a 10 l-volume glass flask which was equipped with a stirrer and which had been previously purged with nitrogen gas, there were charged 250 g of a copolymer of propylene with 7-methyl-1,6-octadiene (7-methyl-1,6-octadiene content: 2.7 mol %, crystallinity: 45% by X-ray diffractometry, MFR: 1.7 g/10 min) and 75 g of glycidyl methacrylate. Subsequently, 5 l of xylene was added thereto, and the mixture was heated at 110° C. with stirring to form a solution. To the solution was dropwise added 25 g of benzyl peroxide dissolved in 500 ml of xylene over a period of 2 hours. After completion of the addition, the reaction was continued at 110° C. for 3 hours. The resulting reaction mixture was poured into 15 l of acetone to precipitate the product which was then collected by filtration and washed. This operation was repeated three times. The product was dried under reduced pressure to obtain a graft-modified olefin copolymer. The copolymer was found to have a glycidyl methacrylate content of 1.2% by weight from infrared spectroanalysis and an MFR of 2 g/10 min. The thus-obtained copolymer is hereafter referred to as epoxy-modified olefin resin (2).

PREPARATION EXAMPLE 3

Into a 10 l-volume glass flask which was equipped with a stirrer and which had been thoroughly purged with nitrogen gas, there were charged 250 g of a propylene homopolymer resin powder (MFR: 1 g/10 min at

TABLE 1

| Example No. | Functionalizing agent | Amount used (parts by weight) | Reaction temperature (°C.) | Yield (%) | Conversion rate of reaction (%) | Absorption position of amino group in IR spectrum (cm$^{-1}$) |
|---|---|---|---|---|---|---|
| 1 | 2-chloroethylamine | 3.5 | 87 | 100 | 100 | 3380 |
| 2 | 3-chloropropylamine | 2.1 | 88 | 100 | 100 | 3380 |
| 3 | 2-bromoethylamine | 2.8 | 85 | 98.3 | 72.1 | 3400 |

PREPARATION EXAMPLE 1

Preparation of Modified Olefin Resin

Into a 10 l-volume glass flask which was equipped with a stirrer and which has been thoroughly purged with nitrogen gas, there were charged 250 g of a propylene homopolymer resin powder (MFR: 1 g/10 min at 230° C. as measured according to ASTM D1238) and 100 g of glycidyl methacrylate. Subsequently, 5 l of chlorobenzene was added thereto, and the mixture was heated at 110° C. with stirring to form a solution. To the solution was dropwise added 25 g of benzyl peroxide dissolved in 500 ml of chlorobenzene over a period of 2 hours. After completion of the addition, the reaction 230° C. as measured according to ASTM D1238) and 50 g of maleic anhydride. Subsequently, 5 l of xylene was added thereto, and the mixture was heated at 110° C. with stirring to form a solution. To the solution was dropwise added 25 g of dicumyl peroxide dissolved in 500 ml of xylene over a period of 2 hours. After completion of the addition, the reaction was continued at 110° C. for 3 hours. The reaction mixture was poured into 15 l of acetone to precipitate the product which was then collected by filtration and washed. This operation was repeated twice. The product was dried under reduced reduce pressure to obtain a graft-modified propylene resin. The graft-modified propylene resin was found to have a maleic anhydride content of 0.72% by weight from infrared spectroanalysis and an MFR of 6.7 g/10 min. The thus-obtained resin is hereafter referred to as epoxy-modified olefin resin (3).

PREPARATION EXAMPLE 4

Into a 10 l-volume glass flask which was equipped with a stirrer and which had been thoroughly purged with nitrogen gas, there were charged 250 g of a copolymer of propylene with 7-methyl-1,6-octadiene (7-methyl-1,6-octadiene content: 2 mol %; crystallinity: 46.5% by X-ray diffractometry; MFR: 2 g/10 min) and 250 g of maleic anhydride. Subsequently, 5 l of chlorobenzene was added thereto, and the mixture was heated at 110° C. with stirring to form a solution. To the solution was dropwise added 0.6 g of benzoyl peroxide dissolved in 500 ml of chlorobenzene over a period of 2 hours. After completion of the addition, the reaction was continued at 110° C. for 3 hours. The resulting reaction mixture was poured into 15 l of acetone to precipitate the product which was then collected by filtration and washed. This operation was repeated twice. The product was dried under reduced pressure to obtain a graft-modified copolymer. The graft-modified copolymer was found to have a maleic anhydride content of 4.8% by weight from infrared spectroanalysis and an MFR of 3.1 g/10 min. The thus-obtained resin is hereafter referred to as carboxyl-modified olefin resin (4).

REFERENTIAL EXAMPLE 1

A confirmative experiment on Example 13 of JP-B-63-503391 (U.S. Pat. No. 4,746,708) was made in this Referential Example 1.

A blend of 100 parts (by weight) of polyphenylene ether and 0.5 part of maleic anhydride was prepared in a Henschel mixer and extruded at 330° C. (extruder wall temperature) using a twin screw extruder. The extrudate, comprising an anhydride-functionalized polyphenylene ether, was quenched in a water bath and a pelletized.

Ethylenediamine, 3 ml, was added to a solution of 10 grams of the said anhydride-functionalized polyphenylene ether in 100 ml of toluene, while the solution was refluxed under nitrogen. Refluxing was continued for 6 hours, gelation resulted, and the reaction could no longer be continued.

Resin Composition

EXAMPLE 4

In 100 ml of xylene were dissolved 5.0 g of the amino group-terminated polyphenylene ether obtained in Example 1 and 5.0 g of a maleic anhydride-modified polypropylene (number average molecular weight: 13,600; weight average molecular weight: 32,800, maleic anhydride content: 8% by weight). The resulting solution was heated for 8 hours at 125° C. in a nitrogen atmosphere to carry out a grafting reaction.

After completion of the reaction, the reaction mixture was introduced into 1 l of methanol to precipitate the resulting reacted polymer. The polymer was collected by filtration, washed with 1 l of methanol and dried at 80° C. under reduced pressure to collect 9.77 g of the polymer.

Subsequently, 1.553 g of the polymer was subjected to Soxhlet extraction for 7 hours using 200 ml of chloroform as the solvent to extract and remove ungrafted polyphenylene ether. The amount of the polyphenylene ether which was extracted and removed was 0.365 g. As a result, the grafted polymer was found to have a polyphenylene ether content of 34.6% by weight.

EXAMPLES 5 to 8 and COMPARATIVE EXAMPLES 1 and 2

The amino group-terminated polyphenylene ether resin obtained in Example 2, the epoxy-modified olefin resins obtained in Preparation Examples 1 and 2, unmodified polyphenylene ether (a product of Nippon Polyether KK, intrinsic viscosity: 0.3 dl/g as measured in chloroform at 30° C.) and ethylene propylene rubber [Japan Synthetic Rubber Co., Ltd. EPR EP07P (trade mark)] were used. These components at a composition ratio given in Table 2 were melt kneaded in a 60 ml-volume Plastomill manufactured by Toyo Seiki KK at 230° C. and 180 rpm for 10 minutes. The physical properties of the resulting resin compositions were evaluated in the following manner.

(1) Dispersion State

The cross section of the resin composition was observed under a scanning electron microscope S-2400 manufactured by Hitachi, Ltd.

(2) Izod Impact Strength

Unnotched Izod impact strength was measured at 23° C. on thicknesses of a 2 mm thick sheet specimen obtained by press molding the resin composition at 260° C. according to JIS K7110.

(3) Organic Solvent Resistance

Organic solvent resistance was measured according to the Bergen's ¼ ellipse method [SPE Jornal 667 (1962)]. That is, a 2 mm thick sheet specimen was fixed on a quarter-elliptical holder (longer axis: 24 cm, shorter axis: 8 cm) and dipped in commercially available gasoline for 5 minutes. The minimum strain which caused cracks in the thus treated specimen, i.e., the limiting strain, was determined and evaluation was made according to the following criterion.

The mark ⊚: No crack was observed (excellent).
The mark ◯: Limiting strain: >1.5% (good).
The mark Δ: Limiting strain: 1.0–1.5% (normal).
The mark X: Limiting strain: <1.0% (bad).

The results are shown in Table 2. It is apparent from the results that when the amino group-terminated polyphenylene ether resin is blended with the epoxy-modified olefin resin, a homogenous dispersion of the polyphenylene ether resin in the form of nearly fine spheres can be formed, and thermoplastic resin compositions having greatly improved impact strength and excellent solvent resistance can be obtained.

TABLE 2

|  | Example | | | | Comp. Ex. | |
| --- | --- | --- | --- | --- | --- | --- |
|  | 5 | 6 | 7 | 8 | 1 | 2 |
| Composition (parts by weight) | | | | | | |
| Amino group-terminated polyphenylene ether resin | 50 | 50 | 20 | 50 | — | 100 |

TABLE 2-continued

|  | Example | | | | Comp. Ex. | |
|---|---|---|---|---|---|---|
|  | 5 | 6 | 7 | 8 | 1 | 2 |
| (2) | | | | | | |
| Modified olefin resin(1) | 50 | — | 80 | 35 | 50 | — |
| Modified olefin resin(2) | — | 50 | — | — | — | — |
| Unmodified polyphenylene ether resin | — | — | — | — | 50 | — |
| EPR | — | — | — | 15 | — | — |
| Evaluation of physical properties | | | | | | |
| Izod impact strength (kg·cm/cm$^2$) | 7.8 | 10.3 | 11.7 | 12.1 | 4.5 | 4.1 |
| Organic solvent resistance | ○ | ○ | ○ | ○ | x | x |
| Dispersion diameter of polyphenylene ether resin (μm) | 0.5–10 | 0.1–2 | 0.5–5 | 1–10 | 50< | — |
| Shape of dispersion of polyphenylene ether resins | spherical | spherical | spherical | spherical | indeterminate | — |

EXAMPLES 9 to 12 and COMPARATIVE EXAMPLES 3 and 4

The amino group-terminated polyphenylene ether resin obtained in Example 2, the carboxyl-modified olefin resins (3) and (4) obtained in Preparation examples 3 and 4, polypropylene [Mitsubishi Polypro MA 8 (trade name) manufactured by Mitsubishi Petrochemical Co., Ltd., MFR: 1 g/10 mins. (ASTM D 1238)] and unmodified polyphenylene ether (a product of Nippon Polyether KK; intrinsic viscosity: 0.3 dl/g as measured in chloroform at 30° C.) were used. These components at a composition ratio as given in Table 3 were melt kneaded in a 60 ml volume Plastomill manufactured by Toyo Seiki KK at 230° C. and 180 rpm for 10 minutes. The physical properties of the resulting thermoplastic resin compositions were evaluated.

The results are shown in Table 3. It is apparent from the results that when the amino group-terminated polyphenylene ether resin is blended with the modified olefin resin, a homogeneous dispersion of the polyphenylene ether resin in the form of a nearly fine spheres can be formed, and thermoplastic resin compositions having greatly improved impact strength and excellent solvent resistance can be obtained.

EXAMPLES 13 to 17 and COMPARATIVE EXAMPLES 5 to 7

The amino group-terminated polyphenylene ether resins (2) and (3) obtained in Examples 2 and 3, a polyamide resin(nylon 6, trade name: Ultramid KR4111, a product of BASF) and unfunctionalized polyphenylene ether (a product of Nippon Polyether KK, intrinsic viscosity: 0.3 dl/g as measured in chloroform at 30° C.) were used. These components at a composition ratio as given in Table 4 were melt kneaded in a 60 ml volume Plastomill manufactured by Toyo Seiki KK at 250° C. and 180 rpm for 10 minutes. The resulting resin composition was press molded at 280° C. to prepare a 2 mm thick sheet. The sheet was cut into specimens, and the physical properties thereof were evaluated.

The appearance of the molded articles was evaluated in the following manner.

The resin composition was injection molded into a 47 mm long, 5.3 mm wide and 2.6 mm thick specimen, and the appearance, mainly the delamination of the specimen, was observed and evaluated as follows.
The mark ○: No problem for practical use.
The mark Δ: Improvement is needed for practical use.
The mark x: Extremely poor for practical use.

The results are shown in Table 4. It is apparent from the results that when the modified polyphenylene ether

TABLE 3

|  | Example | | | | Comp. Ex. | |
|---|---|---|---|---|---|---|
|  | 9 | 10 | 11 | 12 | 3 | 4 |
| Composition (parts by weight) | | | | | | |
| Amino group-terminated polyphenylene ether resin (2) | 50 | 50 | 50 | 35 | — | 50 |
| Modified olefin resin(3) | 50 | — | 25 | 65 | 50 | — |
| Modified olefin resin(4) | — | 50 | — | — | — | — |
| Polypropylene | — | — | 25 | — | — | 50 |
| Unmodified polyphenylene ether resin | — | — | — | — | 50 | — |
| Evaluation of physical properties | | | | | | |
| Izod impact strength (kg·cm/cm$^2$) | 26.5 | 20.4 | 10.9 | 27.1 | 4.5 | 5.5 |
| Organic solvent resistance | ○ | ○ | ○ | ○ | x | x |
| Dispersion diameter of polyphenylene ether resin (μm) | 0.5–1 | 0.1–1 | 2–10 | 0.2–1 | 50< | 50< |
| Shape of dispersion of polyphenylene ether resin | spherical | spherical | spherical | spherical | indeterminate | indeterminate | resin is blended with the polyamide resin, a uniform dispersion of the polyphenylene ether in a form of a nearly fine spheres is formed, and compositions having excellent impact strength and high-temperature modulus can be obtained.

TABLE 4

|  | Example | | | | | Comparative Example | | |
|---|---|---|---|---|---|---|---|---|
|  | 13 | 14 | 15 | 16 | 17 | 5 | 6 | 7 |
| Amino group-terminated polyphenylene ether resin(2) | 20 | 50 | 25 | — | 20 | — | — | — |
| Amino group-terminated polyphenylene ether resin(3) | — | — | — | 25 | — | — | — | — |
| Unfunctionalized polyphenylene ether resin | — | — | 25 | 25 | 20 | 50 | 40 | 100 |
| Nylon 6 | 80 | 50 | 50 | 50 | 60 | 50 | 60 | — |
| Izod impact strength (Kg · cm/cm$^2$) | 43.7 | 47.4 | 46.1 | 37.9 | 45.1 | 25.7 | 33.3 | 3.1 |
| Dispersion diameter of PPE ($\mu$m) | 1> | 2> | 1-2 | 1-2 | 1> | 5-20 | 2-5 | — |
| Shape of dispersion | spherical | spherical | spherical | spherical | spherical | spherical | spherical | — |
| Appearance of molded article | ○ | ○ | ○ | ○ | ○ | x | Δ | x |

While the invention has been described in detail and with reference to specific examples thereof, it will be apparent to one skilled in the art that various changes and modifications can be made therein without departing from the spirit and scope thereof.

What is claimed is:

1. A process for producing an amino group terminated polyphenylene ether represented by the following general formula (I)

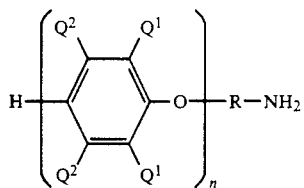

(I)

wherein $Q^1$s each represent a halogen atom, a primary or secondary alkyl group having 1 to 12 carbon atoms, an aryl group having 6 to 12 carbon atoms, an aminoalkyl group having 1 to 12 carbon atoms, a hydrocarbon oxy group having 1 to 12 carbon atoms or a halohydrocarbon oxy group having 1 to 12 carbon atoms; $Q^2$s each represents a hydrogen atom, a halogen atom, a primary or secondary alkyl group having 1 to 12 carbon atoms, an aryl group having 6 to 12 carbon atoms, a haloalkyl group having 1 to 12 carbon atoms, a hydrocarbon oxy group having 1 to 12 carbon atoms, or halohydrocarbon oxy group having 1 to 12 carbon atoms; R represents an aliphatic hydrocarbon group having 1 to 32 carbon atoms, an aromatic hydrocarbon group having 6 to 32 carbon atoms or an araliphatic hydrocarbon group having 7 to 12 carbon atoms; and n is a number of 10 to 500, which process comprises reacting a polyphenylene ether represented by the following general formula (II)

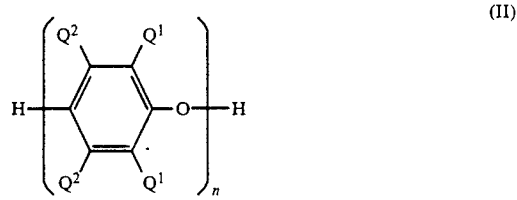

wherein $Q_1$, $Q_2$ and n are as defined above, with a primary amine halide represented by the following general formula (III)

X—R—NH$_2$     (III)

wherein R is as defined above, and X represents a halogen atom.

2. A process as claimed in claim 1, wherein said primary amine halide of general formula (III) is a compound selected from the group consisting of 2-chloroethylamine, 3-chloropropylamine and 2-bromoethylamine.

* * * * *